United States Patent [19]

Gailbreath, Jr. et al.

[11] Patent Number: 5,142,425
[45] Date of Patent: Aug. 25, 1992

[54] DISK DRIVE IN WHICH MAGNETIC HEAD-TO-DISK CAPACITIVE COUPLING IS ELIMINATED

[75] Inventors: Samuel H. Gailbreath, Jr., Boise; Robert J. Davidson, Eagle, both of Id.

[73] Assignee: Hewlett-Packard Company, Palo Alto, Calif.

[21] Appl. No.: 564,935

[22] Filed: Aug. 9, 1990

[51] Int. Cl.⁵ .................. G11B 5/17; G11B 33/14; G11B 5/40; H05F 1/00
[52] U.S. Cl. ..................... 360/123; 360/97.02; 360/128; 361/212
[58] Field of Search ............... 360/123, 124, 122, 125, 360/126, 127, 110, 103, 119, 128, 129, 97.02; 369/72, 126; 361/220, 212

[56] References Cited

U.S. PATENT DOCUMENTS

| | | | |
|---|---|---|---|
| 4,058,846 | 11/1977 | Knutson et al. | 360/121 |
| 4,295,173 | 10/1981 | Romankiw et al. | 360/122 |
| 4,317,149 | 2/1982 | Elser et al. | 360/126 |
| 4,459,691 | 7/1984 | Yamada | 369/126 |
| 4,713,711 | 12/1987 | Jones, Jr. et al. | 360/123 |
| 4,761,699 | 8/1988 | Ainslie et al. | 360/103 |
| 4,800,454 | 1/1989 | Schwarz et al. | 360/123 |
| 4,823,205 | 4/1989 | Hannon et al. | 360/103 |
| 4,841,395 | 6/1989 | Craft | 360/128 |
| 4,885,649 | 12/1989 | Das | 360/126 |
| 4,885,650 | 12/1989 | Banka et al. | 360/129 |
| 4,987,514 | 1/1991 | Gailbreath et al. | 361/220 |
| 4,999,724 | 3/1991 | McAllister et al. | 360/98.08 |
| 5,001,591 | 3/1991 | Nakashima | 360/103 |

*Primary Examiner*—John H. Wolff
*Assistant Examiner*—Craig A. Renner
*Attorney, Agent, or Firm*—E. F. Oberheim

[57] ABSTRACT

A thin film magnetic data transducer which prevents capacitive coupling between the transducer and the disk of a disk drive system, has a magnetic circuit which is maintained at the same potential as the disk, usually ground potential. With the disk and the magnetic pole tips of the magnetic circuit at the same potential, capacitive charging and consequent current flow or arcing or discharge noise between the two are prevented. Noise from current due to the variable capacitive coupling of the coil to the disk during disk rotation is also eliminated. The thin film magnetic transducer is fabricated by depositing successive layers of an electrical insulating material, a magnetic material, insulating material, electrical conducting material for a planar coil, insulating material and magnetic material, in the order named on a substrate. The planar coil comprises spiral turns and the magnetic material layers are joined with each other within the spiral turns of the coil and encircle the coil, providing a magnetic gap between pole tips outside the of the coil. A thin film extension of the magnetic circuit is part of a circuit which connects the magnetic circuit to the frame of the disk drive as are the disks, which is usually ground potential.

4 Claims, 3 Drawing Sheets

U.S. Patent    Aug. 25, 1992    Sheet 2 of 3    5,142,425
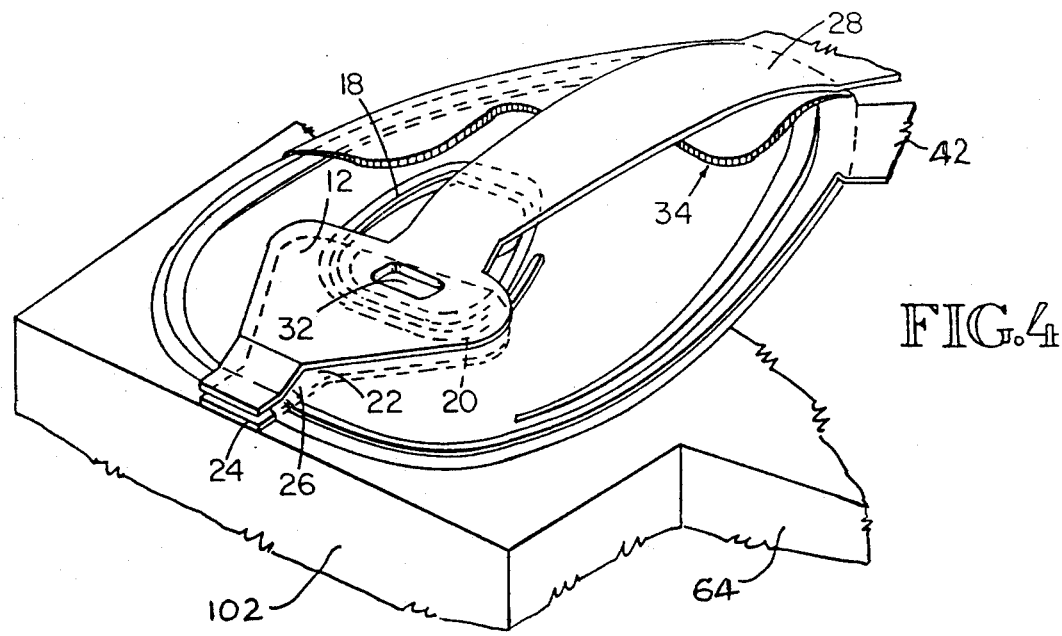
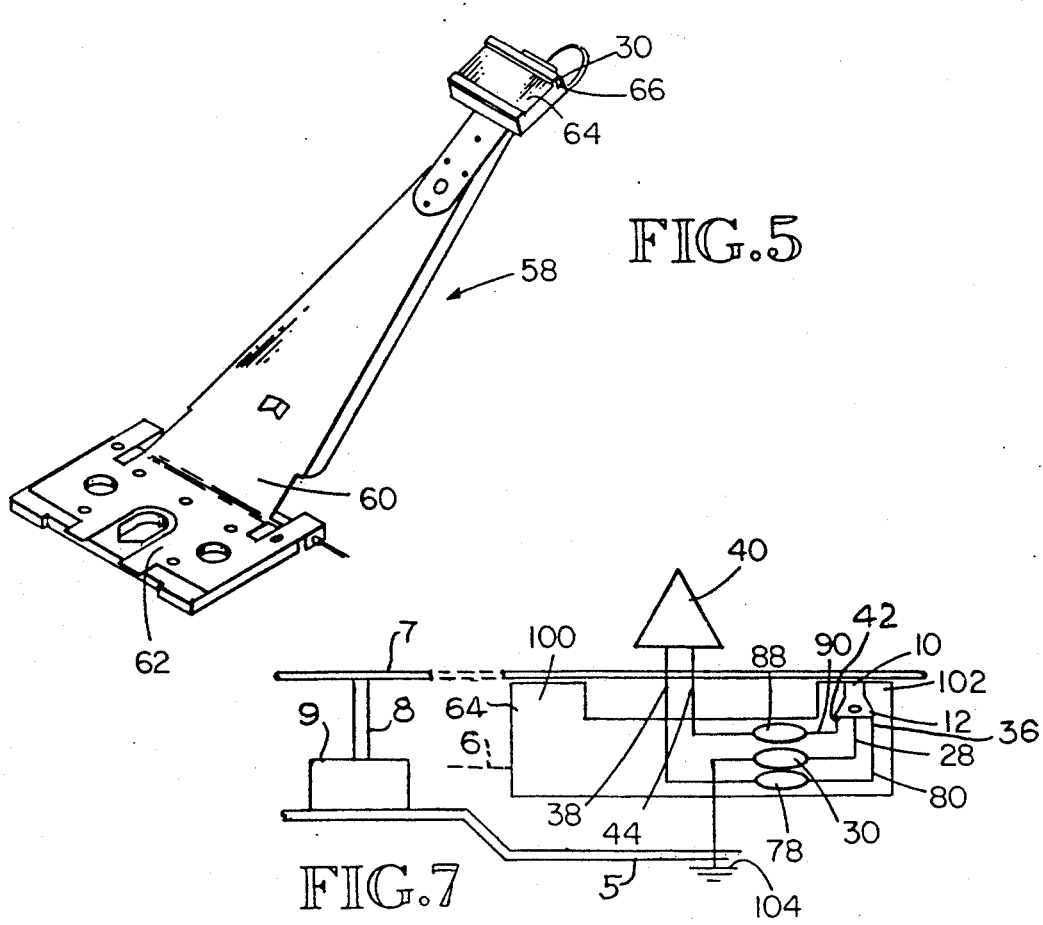

DISK DRIVE IN WHICH MAGNETIC HEAD-TO-DISK CAPACITIVE COUPLING IS ELIMINATED

BACKGROUND OF THE INVENTION a) Field of the Invention

The present invention relates generally to disk drives comprising thin film magnetic transducers and, in particular to improvements in such transducers and their electrical connection in the drives for preventing capacitive coupling between the magnetic pole tips of the transducers and adjacent disks.

b) Background Art

In current computer technology, the common mass storage device is a hard disk drive wherein data is stored on disks as magnetic patterns on a thin film of magnetic material on the surface of the disk. The data is recorded and read by the thin film magnetic transducer or "head". Within the magnetic thin film transducer is a magnetic circuit comprising a thin film pole structure which is wrapped around or encircles the turns of a flat, spirally wound coil. The thin film pole structure comprises spaced pole tips beyond the outer periphery of the coil, defining a magnetic gap therebetween. The transducer is positioned so that the pole tips scan a disk surface as the disk rotates. The coil is connected in an amplifier circuit which maintains the coil at a potential above the potential of the disks, usually 5 volts. The coil is insulated from the magnetic circuit with a photo-resistive material which is ideally a high resistance insulator, but may have portions with poor insulating qualities due to imperfections, such as tiny holes in the photo-resistive material or extraneous pieces of metal left on the photo-resistive material during processing which capacitively couples the coil to the pole tips. There is therefore, often a charge present on the pole tips of the transducer. A problem occurs when the transducer comes near a peak or other anomaly on the disk and discharges occur from the pole tips to the disk. Electrical discharge from the pole tips of the transducer to the disk can destroy a thin film transducer. Further, the noise created by a less than damaging electrical discharge can cause errors in reading data from the disk. In addition, there are always displacement currents due to variable capacitive coupling between the pole tips and the grounded disk. Electrostatic shielding and elimination of the potential difference between the pole tips and the thin film metallic disk is therefore needed to prevent the introduction of noise into the disk drive electronics.

One method of avoiding this problem has been to apply a bias voltage to the disk which is equal to the amplifier voltage on the transducer, thereby placing the disk and the transducer at the same potential. One advantage to this technique is that any transducer can be used with the disk being charged to meet the potential of the transducer. However, this adds complexity in disk drive manufacturing and the resultant possibility of poor yields and high component costs.

U.S. Pat. No. 4,317,149 to Elser et al discloses a magnetic head assembly having conductive strips that function as bypass paths to discharge static electrical charges at a distance from the effective magnetic pole pieces and transducing gap.

U.S. Pat. No. 4,761,699 to Ainslie et al teaches a method for attaching a slider to a suspension in a data recording disk file using reflowed solder balls instead of epoxy binding to avoid static discharge from the pole tips of the transducer to the disk.

U.S. Pat. No. 4,800,454 to Schwarz et al discloses a method of static charge protection for magnetic thin film transducers which uses a conductor which makes electrical contact with the flyer body and with the magnetic core to prevent electrostatic discharge between the flyer body and the pole tip. An opening is formed in the insulating layer between the thin film transducer and the conducting substrate.

A problem occurs with this technique of static charge protection in that the flyer body is mildly conducting so that a charge can build up and subsequently discharge from the pole tip to the disk. A problem is also presented by the requirement in Schwarz et al of forming an opening in the insulating layer between the flyer body and the magnetic core which requires going through up to 10 microns of $Al_2O_3$ which is difficult to penetrate and requires additional processing steps in forming the transducer, which effects the yield.

SUMMARY OF THE INVENTION

In order to overcome problems inherent in the prior art, it is desired to electrically isolate the coils from the pole tips thereby preventing current flow from the coils to the pole tips and subsequent discharges from the pole tips to the disk. A pre-amplifier energizes the coils in the thin film transducer and it is desired to use a non-zero bias pre-amplifier because a zero bias pre-amplifier is more complex and requires both a positive and a negative power supply. A non-zero bias pre-amplifier is therefore simpler and less costly to use. Since it is desirable to use a non-zero bias pre-amplifier, typically at 5 volts above ground, and since the pre-amplifier energizes the coils, the coils will also be at 5 volts above ground. In order to prevent current flow from the pre-amplifier to the coils and from the coils to the magnetic core and pole tips and in turn to the disk, the coil is insulated from the pole tips. It is well known that when two elements of a circuit are at the same potential there is no current flow between them. In the present invention in order to prevent the further possibility of discharge from the pole tips at pre-amplifier potential to the disk at ground potential, grounding the pole tips will prevent discharge and current flow from the pole tips to the disk.

In the present invention, the pole tips are grounded by attaching the magnetic circuit, of which the poles or pole tips are a part, to an electrical connection which is external to the transducer. The coils are spirally wound and disposed one above the other. In previous, two coil, thin film magnetic data transducers, the upper coil and the lower coil were connected at their adjacent inner ends by a coil bond pad and a conductor provided an electrical connection from the coil pad to a center bond pad. The center bond pad was connected to the amplifier or pre-amplifier. This gave a center tap connection required by previous pre-amplifiers and the poles of the magnetic circuit were not connected, that is, they were electrically isolated in the magnetic head structure. On current thin film transducers the coils are still connected together by a coil bond pad to complete the coil circuit. The center bond pad remains as part of the thin film fabrication, although not used since the current pre-amplifiers do not require it. In the preferred embodiment of the present invention, the unused center bond pad connection for the center tap is disconnected from the connection between the coils at the coil bond pad and is connected to the thin film poles of the magnetic circuit and is used to ground the poles.

In addition, there is another type of noise occurring from displacement currents which the present invention eliminates. There is a capacitance between the disk and the pole tips and another unbalanced capacitance due to processing differences between the coil and the pole tips. The pole tip to disk capacitance is variable depending on the separation between the pole tips and the disk as the disk rotates. As the transducer flies over the disk and encounters a small bump or depression on the disk the capacitance changes suddenly, causing displacement current which is a flow of charge in the circuit due to the change in capacitance with a fixed potential applied. At an AC level, the displacement currents adjust rapidly and if the circuit is changing rapidly due to bumps on the disk, noise will be introduced on the line which will be amplified to larger noise causing a problem in reading correct data from the disk due to noise generated by the imbalance between the poles and the coil. By grounding the pole tips, the pole tips and the disk are at the same potential so that there is no displacement current between the pole tips and the disk and an electrostatic shield is thereby provided.

There are, therefore, two types of electrical discharge noise encountered from the thin film magnetic transducer to the disk which are eliminated by the present invention. First, is the noise due to actual current flow between the coil and the disk via the insulator defects and the pole tips and secondly, is the noise from the capacitive coupling of the coil to the disk and the flow of displacement currents.

In the present invention, with the connection of the poles of the magnetic circuit to the center bond pad, there is also provided a test point for measuring pole to coil resistance and/or other electrical parameters, allowing the detection of a defect in the photo resist insulator and allowing the subsequent determination of whether the transducer is functioning as required prior to assembly in the disk drive. This is an important advantage in eliminating unnecessary expenses from the manufacturing process.

It is therefore an object and advantage of the present invention to provide an apparatus and method of preventing electrical discharges from the pole tips to the disk of a disk drive in order to permit the use of a non-zero bias pre-amplifier and to have the pole and disk at the same potential so as to avoid current flow between the two.

It is yet another object and advantage of the present invention to allow the grounding of the pole tips of a magnetic circuit in a thin film magnetic transducer by making only one modification of a photo mask layer and no additional processing steps.

It is another object and advantage of the present invention to avoid capacitive charge caused by displacement current that can build up between the poles and the disk.

It is still yet another object and advantage of the present invention to provide a test point for checking pole to coil resistance and/or other electrical parameters.

These and other objects and advantages of the present invention will become clear upon review of the following specification and drawings.

BRIEF DESCRIPTION OF THE DRAWINGS

FIG. 4 is an enlarged perspective view of a thin film data transducer disposed upon a fragmentary position of a slider.

FIG. 5 is a perspective view of the load beam and flexure of the disk drive which carries the transducer.

FIG. 6 shows the shape of the holes in the photo mask (or negatives) used in the photolithography on the insulating layer.

FIG. 7 schematically illustrates a disk drive assembly showing the electrical connections of the magnetic circuit of the magnetic head to the disks.

DESCRIPTION OF THE PREFERRED EMBODIMENT

Figure 1:
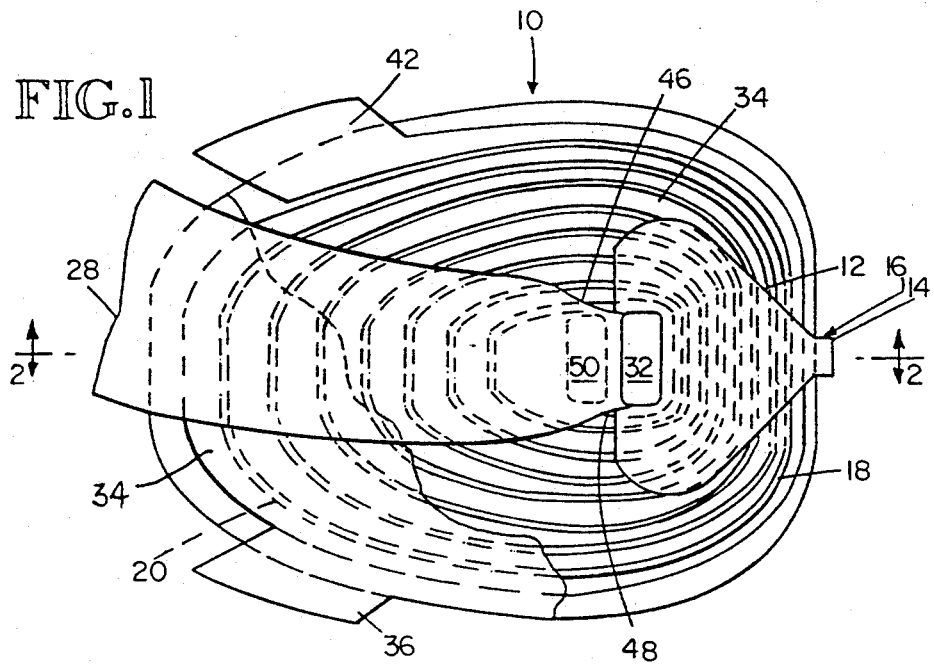
FIG. 1 is an enlarged top plan view, with the upper layer partially removed, of a thin film magnetic transducer.
Figure 2:
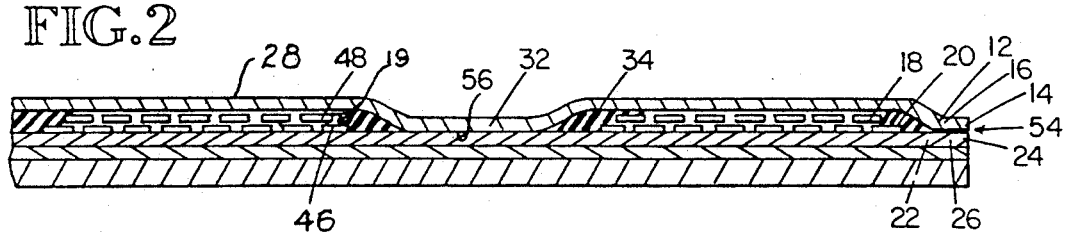
FIG. 2 is an enlarged cross-sectional view of the thin film data transducer taken on line 2—2 of FIG. 1, showing the two layers of coil ad the pole tips in greater detail.

Referring now to the drawings in general and in particular to FIG. 1 of the drawings there is shown an enlarged plan view, with the upper layer partially removed, of a thin film transducer shown generally by the number 10. Within the transducer 10 is an upper thin film magnetic core or pole 12, having an upper pole tip 14 shown as a projection from the upper pole 12 in the upper pole tip region 16. Positioned beneath the upper magnetic core or pole 12 is a two layer coil structure comprising the coils 18 and 20. In current thin film transducer technology, a two layer coil is used between the upper pole 12 and a lower pole 22. A single layer coil could, however, be used within the spirit and scope of the invention. These coils are spirally wound and are flat. In FIG. 1, there can be seen the upper coil 18 of the two layer coil and a partial view of the lower coil 20. The transducer 10, as shown in FIG. 2, has a lower thin film magnetic core or pole 22 having a lower pole tip 24, also shown as a projection from the lower pole 22 in the lower pole tip region 26, in the same manner as the upper pole 12. In previous thin film magnetic transducers, the upper coil 18 and lower coil 22 were connected at their inner ends by a coil bond pad 19 and a conductor such as a conductor 28, FIG. 1, provided an electrical connection from the bond pad 19. This provided a coil center tap connection, required by previous pre-amplifiers. In the present invention, as seen in FIG. 2, the connection 19 between the inner ends of the upper coil 18 and lower coil 20 is maintained by the coil bond pad 19, but the conductor 28 is disconnected therefrom. The conductor 28 is now connected to either the upper pole 12 or the lower pole 22. The poles 12 and 22 are connected or joined to each other by the via connection 32 between the poles 12 and 22 at the inner ends of the coils 18 and 20. Since it is desirable to use a non-zero bias pre-amplifier, typically at 5 volts above ground to energize the coils 18 and 20, the coils 18 and 20 in the transducer 10 will also be at 5 volts above ground. In order to prevent current flow from the coils 18 and 20 to the magnetic poles 12 and 22 and to the pole tips 14 and 24, the poles 12 and 22 are insulated from the coils 18 and 20 by the insulator 34.

FIG. 2 shows an enlarged cross-sectional view of the thin film data transducer taken on line 2—2 of FIG. 1 showing the upper and lower coils 18 and 20 and the poles and pole tips in greater detail. In FIG. 2, there can be seen the upper coil 18 and the lower coil 20. These are insulated from each other and from the magnetic poles 12 and 22 by the insulating material 34 such as photoresist. The end 36 of the outermost turn of the lower coil 20 (as seen in FIG. 1) is a pad providing a point for connection to one terminal 38 (FIG. 7) of the pre-amplifier 40 and the end 42 of the outermost turn of the upper coil 18 (as seen in FIG. 1) is a pad providing a point for connection to the other terminal 44 of the pre-amplifier 40, also as seen in FIG. 7. The innermost turn 46, FIG. 2, of the lower coil 20 is connected to the innermost turn 48, FIG. 2, of the upper coil 18 at the via 50, FIG. 1, by the pad 19, FIG. 2. In FIG. 2, there is an upper pole 12 and a lower pole 22 with the turns of the upper and lower coils 18 and 20 disposed therebetween. There is, therefore, no current flow from one coil to the other through the insulation 34 except at the pad 19 at the via 50 and the magnetic circuit is closed at region 56 by joining the upper and lower poles 12 and 22 at the via 32.

In FIG. 2 there is shown the lower pole 22 with the lower pole tip region 26 and the upper pole 12 with the upper pole tip region 16. The poles 12 and 22 are typically formed of nickel iron, but may be of other suitable compositions. A gap 54 is defined between the upper pole 12 and the lower pole 22. The connected poles are then attached to one end of the electrical connection 28, FIGS. 1, 4 and 7, and the electrical connection 28 is coupled at its opposite end to the disks, that is, to ground (FIG. 7). The electrical connection 28 is external to the transducer.

Figure 3:
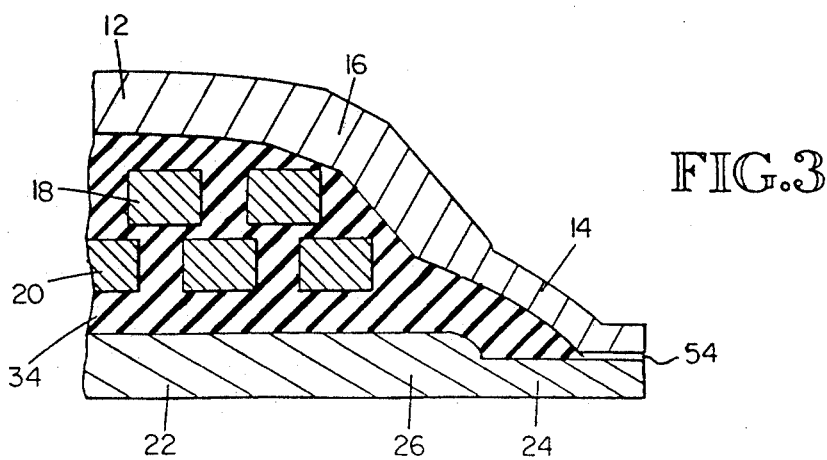
FIG. 3 is an enlarged view of FIG. 2 showing the pole tip region and coil in greater detail.

FIG. 3 is an enlarged view of the pole tip region of the thin film magnetic transducer. It can be seen in FIG. 3 how the coils 18 and 20 can become very close to the poles 12 and 22 in the pole tip regions 16 and 26. The coils 18 and 20 are electrically insulated by the photoresistive material 34 which has a high electrical resistance but which may have portions with poor electrical insulating qualities because of tiny holes in the photo-resistive material or extraneous pieces of metal left on the photo-resistive material during processing which allow current to flow from the coils 18 and 20 to the poles and thence to the pole tips 14 and 24. The present invention prevents the signal noise due to electrical discharge that occurs in prior art arrangements when the pole tips 14 and 24 of the transducer come very near the surface of an adjacent disk.

FIG. 4 is an enlarged perspective view of a thin film data transducer. In the embodiment shown in FIG. 4, it can be seen that the pole connection 28 is an integral part of the upper magnetic pole 12. In an alternate embodiment, the center tap or pole connection 28 would come into direct contact with the lower magnetic pole 22. The depression 32 in the upper pole 12 engages the lower pole 22 to complete the magnetic circuit around the coils 18 and 20.

In FIG. 5, there is shown a perspective view of the load beam and flexure assembly 58 of the disk drive actuator which carries the transducer 10. The lower end 60 of the load beam and flexure assembly 58 has an attaching pad 62 for attaching the assembly 58 to an armstack of a disk drive, as is well known. Positioned on the end of the load beam and flexure assembly 58 is a slider 64 with the bond pad 30 attached on the rear face of the slider 64. Current pre-amplifiers no longer require the use of a center tap coil connection 28 at the coil bond pad 19 (see FIG. 2) so that the electrical connection, using conductor 28 in the present invention now connects the bond pad 30 to the poles 12 and 20. In FIG. 5, the transducer 10 of the present invention would only be visible microscopically, but is attached to the slider 64 at position 66.

In thin film magnetic transducer technology, the layers of the transducer are formed photolithographically. The layers of the transducer comprise insulators, and magnetic and non-magnetic metal layers. The present invention, in its preferred embodiment, is practiced by changing only two layers of the photo masks used in the photolithography. Fabrication of the transducer according to the present invention requires no photolithographic process steps in addition to those normally performed. The modification of the photo mask layer can be made to either the upper pole layer 12 or the lower pole layer 2 and, one insulator layer, which serves to disconnect the connection 28 from the coils 18 and 20, and to form an electrical connection 32 between the upper and lower poles 12 and 22 and the connection bond pad 30. Current thin film magnetic transducers have a junction such as the coil bond pad 19 connecting the inner ends of the upper coil 18 and the lower coil 20. In the present invention, the junction provided by the coil bond pad 19 of the coil layers remains but the former coil center tap connection of conductor 28 is broken. Conductor 28 is now directly connected. With the modification of the photo mask layer disconnecting the conductor 28 from the coils 18 and 20 at the coil bond pad 19, and using conductor 28 to form an electrical connection between the poles 12 and 22 and the bond pad 30, provision is made for the connection of a controlled voltage potential, such as ground, to the magnetic circuit comprising the poles 12 and 22. With the pole tips then connected to ground as is the disk 21 (FIG. 7), the pole tips 14 and 24 and the disk are at the same ground or zero voltage potential, but since the voltage potential can be controlled, the pole tips 14 and 24 and the disk could be at any chosen voltage. This modification of only two layers of the photo mask requires no additional processing steps in the manufacture of the transducer and thereby the yield of the transducer is not effected and the yield of the disk drives is improved.

Figure 6:
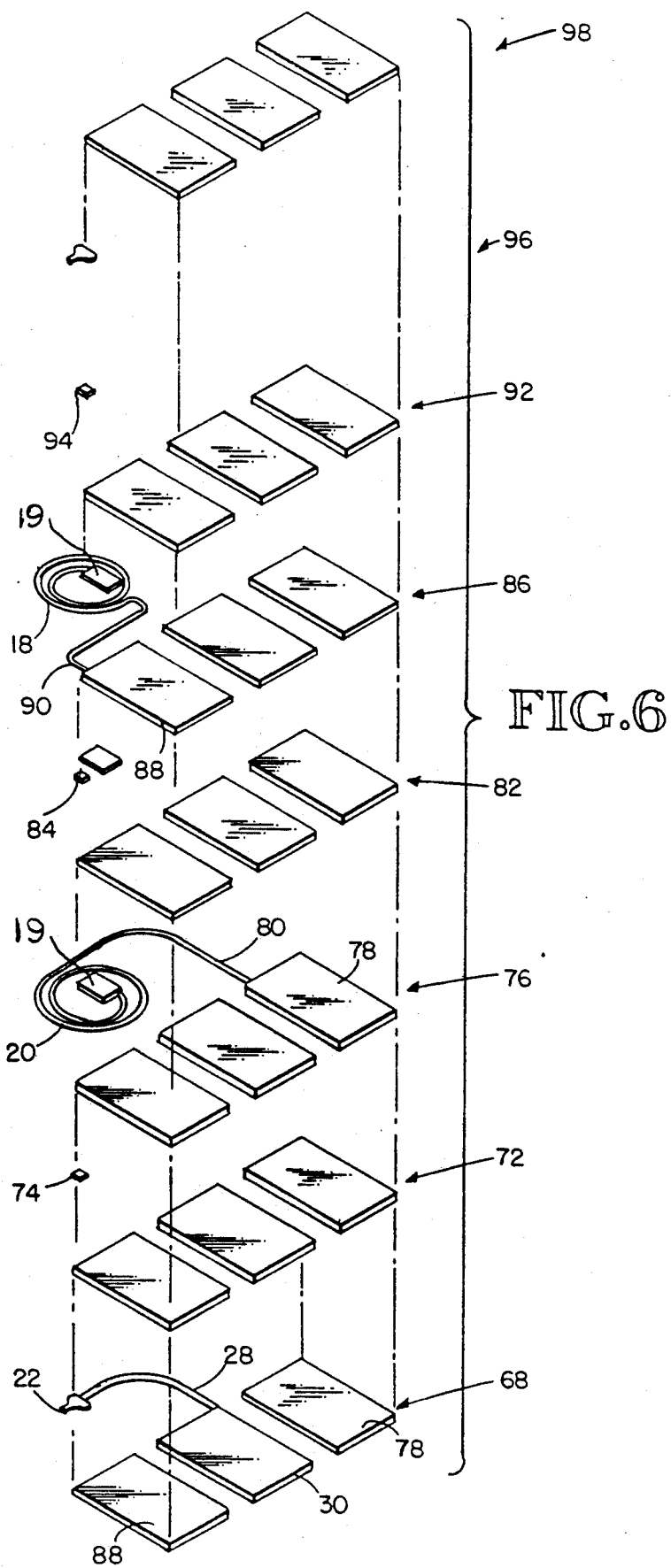
FIG. 6 is an exploded isometric view showing major steps completed in forming the various layers that make up the transducer.

FIG. 6 is an exploded isometric view showing the major processing steps for forming the various layers that make up the thin film magnetic transducer 10. FIG. 6 shows the shape of the holes in the photo mask (or negatives) used in the photolithography on the insulating layer. The holes represent the absence of insulator on the metal layers and the presence of metal. There are more layers used in forming the transducer, however, FIG. 6 is illustrative of the major steps as pertinent to the present invention. FIG. 6 will be described with the modification to the photo mask layer being made to the lower pole layer, however, it is to be understood that the modification can be made to either the upper pole layer or the lower pole layer. In making the modification to the lower pole layer 68 as shown in FIG. 6, there is an electrical connection between the lower pole 22 and the bond pad 30 of the center tap connection 28. The lower pole 22 is connected to the upper pole 12 so that both poles are electrically connected to the bond pad 30 for the center tap connection 28. In the second layer shown generally by the number 72, an insulator 74 is provided for the lower coil 20 of the third layer 76 as is currently done in the present technology. In the third layer 76, the lower coil 20 is connected to a bond pad 78 by connecting wire 80. The bond pad 78 in turn is connected to the preamplifier (not shown in FIG. 6). In the fourth layer as shown generally by the number 82, there is shown the insulator 84 to provide an opening from the lower coil 20 to connect it to the upper coil 18 at the pads 19. In the fifth layer 86, the upper coil 18 is connected to the bond pad 88 by connecting wire 90 which is also, in turn connected to the preamplifier. The coils are connected in series. In the sixth layer as shown generally by the number 92, there is shown the insulator 94 for the upper coil 18 of the fifth layer 86. The seventh layer 96 is the upper pole layer and the eighth layer 98 provides a general insulator which keeps air and contaminants away from the transducer. It can be seen therefore, that a modification has been made only to one layer of the transducer. The sequence of the various insulating layers has been changed to disconnect the center tap connection bond pad from the coils, however the design of these layers remains unchanged.

FIG. 7 illustrates the transducer 10 on a slider 64 integrated into a disk drive system. The slider 64 comprises a body having a first rail 100 and a second rail 102. Positioned on the second rail 102 is the transducer 10 shown symbolically in the form of a core or yoke 12 of magnetic material. Conductors 80 and 90 connect the ends 36 and 42 of the coils 18 and 22 to the bond pads 78 and 88, respectively, which in turn are connected to the pre-amplifier 40 by the conductors 38 and 44, respectively. The bond pads 78, 88 and 30 and the connecting wires 28, 80 and 90 appear in FIG. 6. The connecting wire 28 connects the poles 12 and 22 to the previously unused bond pad 30 for the center tap connection 28 (as shown in the first layer of FIG. 6) and then to ground 104 which grounds the pole tips 14 and 24. In the preferred embodiment of the present invention, the pole tips 14 and 24 are connected to ground as are the disks. However, it is to be appreciated that being at the same potential the pole tips and disks may be at a potential other than ground. The slider 64 is part of a disk drive and is disposed by an actuator 6 in proximity to the surface of a disk 7 mounted on a spindle 8 powered by a motor 9. The actuator 6 and the motor 9 are mounted on a disk drive frame 5. The frame 5 is usually at ground potential, but in some instances is electrically isolated from its environment and the frame 5 may be at some potential other than ground. Since the disk and the thin film poles 12 and 20 of the magnetic circuit of the transducer are connected to the frame 5 they are at frame potential, that is, there is no potential difference between them to cause arcing.

It can be seen that by connecting an ohmmeter between the bond pad 30 and either bond pad 78 or 88 in the coil circuit, a low resistance would indicate that a connection is formed, thereby detecting a pole to coil short. This would be of great advantage to a manufacturer of thin film magnetic transducers, much of the labor intensive work is performed after the transducer has been manufactured, for example, in the labor required to glue or attach the slider to the flexure, and, in fact, the assembly of the drive, so that the manufacture of the transducer only represents about twenty percent or less of the total cost of the disk drive. It would therefore be greatly advantageous to identify a defective transducer at the time of manufacture.

From the foregoing, it can be seen that there has been accomplished by the applicant's invention all of the objects and advantages of the invention. Nevertheless, variations in the structure of the invention and the arrangement of the various parts are within the spirit and scope of the applicants' invention. The embodiments given have been given only by way of illustration and the applicants are not to be limited to the embodiments shown and described.

We claim:

1. In a disk memory drive having a frame, at least one rotatable memory disk on said frame, a magnetic head actuator movably mounted on said frame and electrically connected to said frame, a magnetic head on said actuator disposed to scan a surface of said at least one rotatable memory disk during rotation, and a magnetic head amplifier circuit, said magnetic head comprising:
    a) a pair of spirally wound coils each having an inner end and an outer end, disposed in a coil position one above the other with the inner ends of said coils electrically connected together and the outer ends of said coils physically separated from one another;
    b) a thin film magnetic circuit comprising upper and lower thin film poles of magnetic material having first and second opposite end portions;
        said thin film poles being disposed about and electrically insulated from said coils;
        said first opposite end portions of said thin film poles being connected together and defining a magnetic circuit junction adjacent said inner ends of said coils within said coils;
        said second opposite end portions of said thin film poles being disposed in proximity to one another outside of said coils adjacent said surface of said at least one rotatable memory disk;
    c) electrical insulating means supporting said coils in said coil position one above the other within said thin film magnetic circuit, in electrical isolation from one another and from said thin film magnetic circuit;
    d) circuits connecting said outer ends of said coils to said magnetic head amplifier circuit;
    e) a metallic thin film circuit connected to said thin film magnetic circuit at said magnetic circuit junction; and
    f) means including said frame for providing an electrical connection between said metallic thin film circuit and said at least one rotatable memory disk to maintain said thin film magnetic circuit and said at least one rotatable memory disk at ground potential.

2. A disk memory drive according to claim 1, in which:
    said metallic thin film circuit is a thin film magnetic circuit extension of said thin film magnetic circuit.

3. A disk memory drive according to claim 2, in which:
    said thin film magnetic circuit extension extends from the upper thin film pole of the thin film magnetic circuit.

4. A disk memory drive according to claim 2, in which:
    said thin film magnetic circuit extension is integral with said thin film magnetic circuit at said magnetic circuit junction.

* * * * *